US011518709B2

(12) United States Patent
Bookbinder et al.

(10) Patent No.: US 11,518,709 B2
(45) Date of Patent: Dec. 6, 2022

(54) OPTICAL FIBER COATING DIE ASSEMBLY HAVING INLET TUBE

(71) Applicant: Corning Incorporated, Corning, NY (US)

(72) Inventors: Dana Craig Bookbinder, Corning, NY (US); Darren Andrew Stainer, Wrightsville, NC (US); Pushkar Tandon, Painted Post, NY (US); Ruchi Tandon, Painted Post, NY (US); Bryan William Wakefield, Corning, NY (US)

(73) Assignee: Corning Incorporated, Corning, NY (US)

( * ) Notice: Subject to any disclaimer, the term of this patent is extended or adjusted under 35 U.S.C. 154(b) by 468 days.

(21) Appl. No.: 16/380,603

(22) Filed: Apr. 10, 2019

(65) Prior Publication Data
US 2019/0322578 A1 Oct. 24, 2019

Related U.S. Application Data

(60) Provisional application No. 62/660,598, filed on Apr. 20, 2018.

(51) Int. Cl.
*C03C 25/18* (2006.01)
*C03B 37/025* (2006.01)
*C03C 25/105* (2018.01)

(52) U.S. Cl.
CPC ............ *C03C 25/18* (2013.01); *C03B 37/025* (2013.01); *C03C 25/105* (2013.01); *C03C 2217/78* (2013.01); *C03C 2218/13* (2013.01)

(58) Field of Classification Search
None
See application file for complete search history.

(56) References Cited

U.S. PATENT DOCUMENTS

| | | | |
|---|---|---|---|
| 4,531,959 A | 7/1985 | Kar et al. | |
| 4,792,347 A | 12/1988 | Deneka et al. | |
| 5,366,527 A * | 11/1994 | Amos | C03C 25/12 118/667 |
| 5,974,837 A | 11/1999 | Abbott et al. | |
| 5,997,942 A | 12/1999 | Chang et al. | |
| 2007/0286950 A1 | 12/2007 | Kwon et al. | |
| 2009/0291199 A1 * | 11/2009 | Chludzinski | C03C 25/12 427/9 |

FOREIGN PATENT DOCUMENTS

| | | |
|---|---|---|
| EP | 803482 A1 | 10/1997 |
| EP | 0913368 A2 | 5/1999 |

OTHER PUBLICATIONS

International Search Report and Written Opinion PCT/US2019/027514 dated Jul. 3, 2019, 12 PGS.

* cited by examiner

*Primary Examiner* — Cynthia Szewczyk
(74) *Attorney, Agent, or Firm* — Smit Kapadia

(57) ABSTRACT

An optical fiber coating die assembly is provided. The optical fiber coating die assembly includes a housing defining a guide chamber having an inlet for receiving optical fiber and an outlet, a guide die located at the outlet of the guide chamber, and a sizing die. The optical fiber coating die assembly also includes a coating applicator disposed between the guide die and the sizing die, and a tube operatively coupled to the inlet of the guide chamber and axially aligned with the chamber to receive the optical fiber fed into the guide chamber and provide a barrier to air flow.

16 Claims, 2 Drawing Sheets

OPTICAL FIBER COATING DIE ASSEMBLY HAVING INLET TUBE

This application claims the benefit of priority to U.S. Provisional Application Ser. No. 62/660,598 filed on Apr. 20, 2018, the content of which is relied upon and incorporated herein by reference in its entirety.

FIELD OF THE DISCLOSURE

The present invention is generally directed to optical fiber coating assemblies, and more particularly relates to a coating die assembly and method for coating an optical fiber in a manner that minimizes the introduction of voids within the coating.

BACKGROUND OF THE DISCLOSURE

Optical fibers are generally manufactured to include an inner glass core surrounded by a glass cladding and multiple layers of coatings for bend and damage resistance performance. Most optical fibers currently are manufactured with three coating layers of ultraviolet (UV) curable acrylate polymers. A first coating layer applied onto the outer surface of the optical glass cladding serves as the primary coating layer that acts as an absorbing layer and prevents thermal and mechanical stresses induced in the cable from transferring to the glass. The second coating layer is a high modulus secondary layer which is hard and abrasion resistant. The third coating layer is a thin ink tertiary layer that is applied on the outside of the fiber for identification purposes and this layer is also a high modulus layer that contributes to the abrasion and puncture resistance performance of the fiber.

The individual coatings are typically applied to the optical fiber by passing the fiber through a die coating assembly at a draw speed above 40 meters per second. During the coating process, it may be possible for voids to become entrained in between the coating layers which can result in a visual defect and increased optical fiber attenuation, particularly during thermal cycling. These voids may also be associated with abrasions or roughening of the primary coating and may exist between the secondary and tertiary ink coatings and also between the ink coating and a ribbon matrix in a ribbon stack of optical fibers. The presence of voids in the coating layers typically results in lower yields and higher manufacturing costs and generally make it difficult during the start-up operation of an optical fiber draw. It would be desirable to prevent the creation of voids in the optical fiber coating(s) during the coating process.

SUMMARY OF THE DISCLOSURE

According to some embodiments, an optical fiber coating die assembly is provided. The optical fiber coating die assembly includes a housing defining a guide chamber having an inlet for receiving optical fiber and an outlet, a guide die located at the outlet of the guide chamber, and a sizing die. The optical fiber coating die assembly also includes a coating applicator disposed between the guide die and the sizing die, and a tube operatively coupled to the inlet of the guide chamber and axially aligned with the guide chamber to receive the optical fiber fed into the guide chamber and provide a barrier to air flow, wherein the tube has a length of at least 5 centimeters.

According to some embodiments, an optical fiber coating die assembly is provided. The optical fiber coating die assembly includes a housing defining at least a portion of a guide chamber for receiving optical fiber at an inlet, wherein the guide chamber has a length greater than 10 centimeters. The optical fiber coating die assembly also includes a guide die located at an exit of the guide chamber, a sizing die, and a coating applicator disposed between the guide die and the sizing die.

According to some embodiments, a method of coating an optical fiber is provided. The method includes the steps of drawing the optical fiber into a tube having an internal cylindrical bore and a length of at least 5 centimeters, drawing the optical fiber from the tube into a guide chamber in a housing of a coating die assembly, and flowing a purge gas into the guide chamber and exiting the tube at an inlet. The method further includes the steps of passing the optical fiber through a guide die, coating the optical fiber with a coating layer using a coating applicator, and exiting the optical fiber through a sizing die.

DETAILED DESCRIPTION

Reference will now be made in detail to the present preferred embodiments of the invention, examples of which are illustrated in the accompanying drawings. Whenever possible, the same reference numbers will be used throughout the drawings to refer to the same or like parts. An example of an optical fiber and a preferred embodiment of the manufacture of the optical fiber and an optical fiber coating die assembly for coating the fiber during manufacture is shown in FIGS. 1-3.

Figure 1:
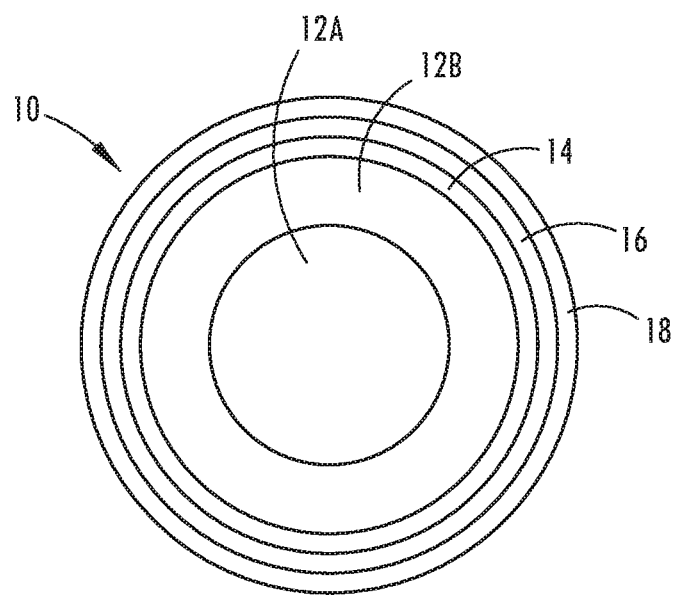
FIG. 1 is an end view of an optical fiber having three coating layers, according to one embodiment.

Referring now to FIG. 1, an exemplary optical fiber is shown generally designated by reference numeral 10, according to one example. The optical fiber 10 includes a glass core 12A surrounded by a glass cladding 12B, both generally made of glass such as doped silica. The optical fiber 10 also includes one or more protective coating layers that surround the generally cylindrical outer surface of the glass cladding 12B.

In the embodiment shown and described herein, the optical fiber 10 has three ultraviolet (UV) curable acrylate polymer coating layers that provide bend and damage resistance performance. A first or primary coating layer 14 applied onto and surrounding the outer surface of the glass cladding 12B is a soft low modulus primary coating that acts as an absorbing layer and prevents thermal and mechanical stresses induced in the optical fiber 10 from transferring to the glass core 12A and the glass cladding 12B. The primary coating layer 14 may have a modulus of less than 1.5 MPa at room temperature (e.g., 23° C.). A second or secondary coating layer 16 applied over and surrounding the primary coating layer 14 provides a high modulus secondary layer, which is hard and abrasion resistant. The secondary coating layer 16 may have a modulus greater than 1,000 MPa at room temperature. A third or ink tertiary coating layer 18 applied over and surrounding the surface of the secondary coating layer 16 serves as a thin ink tertiary layer which is the outermost layer of the optical fiber 10 and may include color and/or print to be used for identification purposes. The ink tertiary coating layer may also have a high modulus, such as greater than 1,000 MPa, or more particularly greater than 1,500 MPa or typically greater than 2,000 MPa at room temperature. The ink tertiary coating layer 18 may also contribute to the abrasion/puncture resistance performance of the optical fiber 10.

Figure 2:
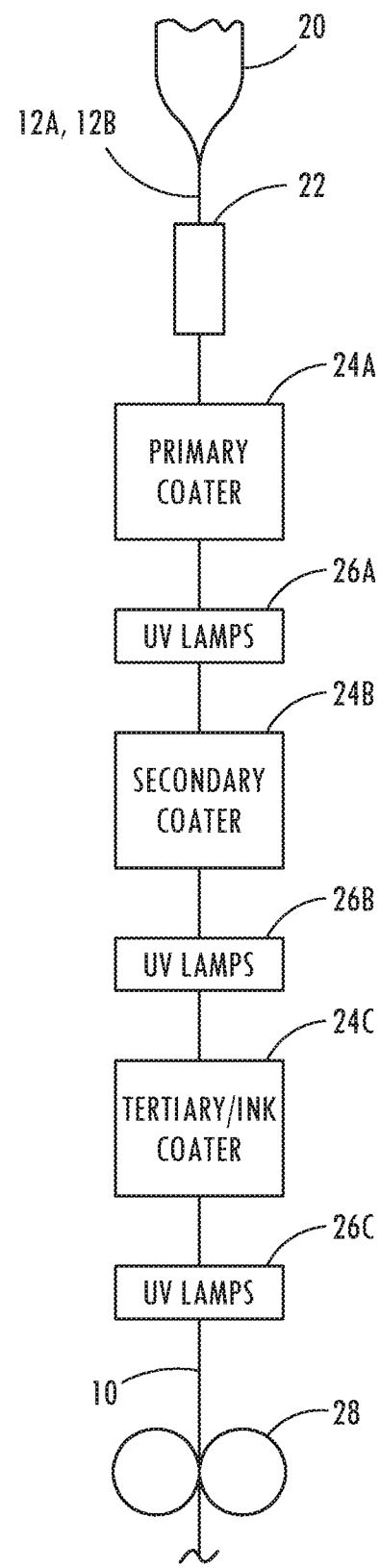
FIG. 2 is a schematic block diagram of an optical fiber production/draw system employing optical fiber coating die assemblies, according to one embodiment.
Figure 3:
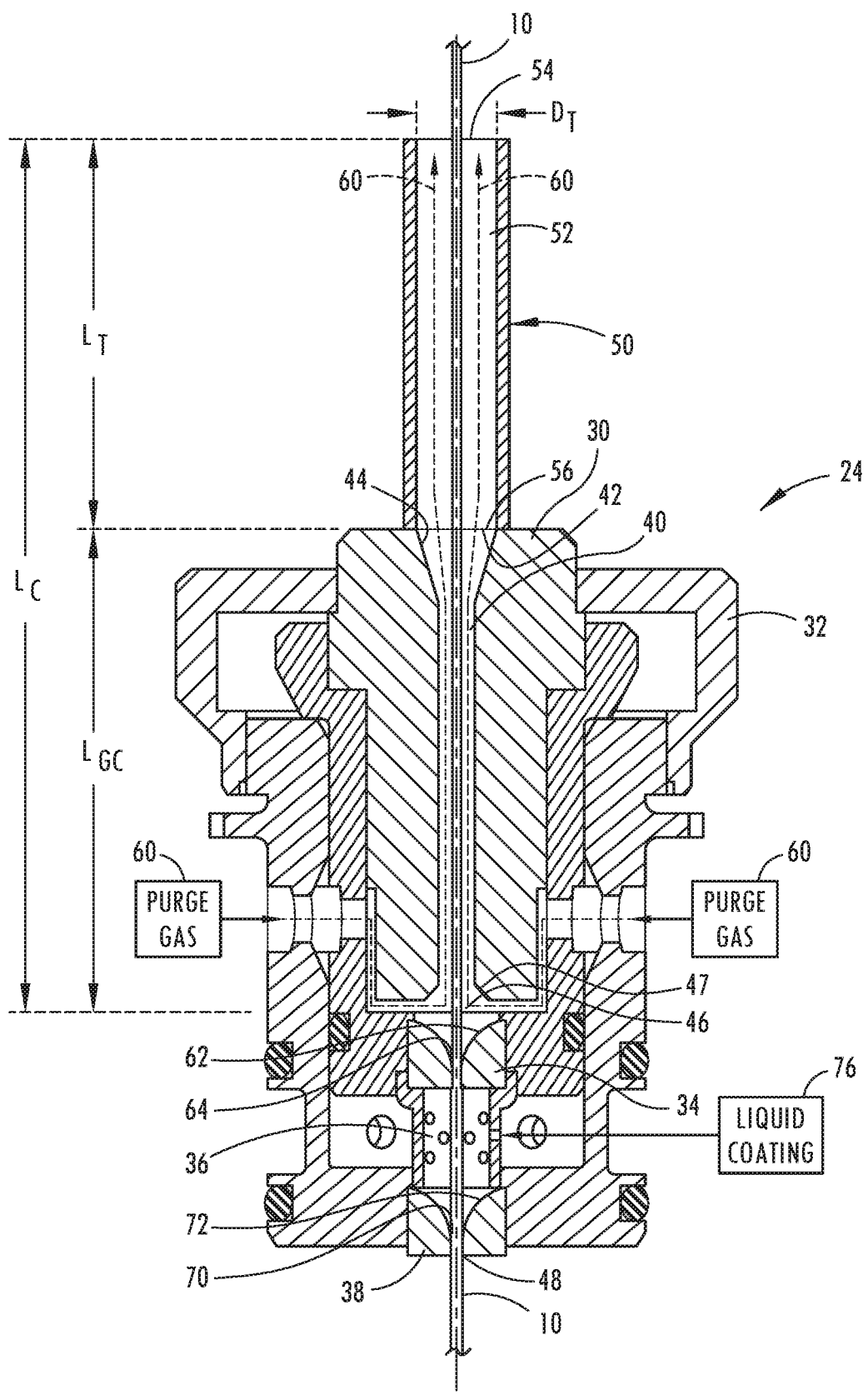
FIG. 3 is a cross-sectional view of an optical fiber coating die assembly, according to one embodiment.

Referring to FIG. 2, a schematic of an optical fiber draw tower and coating manufacturing process for forming the optical fiber 10 is illustrated generally in a block diagram, according to one embodiment. Generally, the optical fiber 10 is drawn in a fiber draw system that employs a glass preform 20 which is heated in a furnace at a temperature around 2000° C. The heated glass preform 20 forms a molten tip that forms onto a glass fiber that is drawn typically with a pair of tractors 28 to draw the fiber from the molten tip glass, typically at a draw speed greater than 40 meters/second. The optical fiber 10 having the glass core 12A and glass cladding 12B exits the furnace and typically passes through a cooling tube 22 to cool and solidify the glass, and thereafter may be coated with one or more protective coating layers.

In the embodiment shown, the cooled optical fiber 10 is first drawn through a primary coater 24A to apply an ultraviolet (UV) curable acrylate polymer liquid as the primary coating layer onto the outer cylindrical surface of the glass cladding. The optical fiber 10 with the liquid primary coating subsequently passes through a first set of primary UV lamps 26A that cure and solidify the primary coating layer. Next, the optical fiber 10 with the cured primary coating layer then passes through a secondary coater 24B to apply a UV curable acrylate liquid secondary coating. The optical fiber 10 with the liquid secondary coating then passes through a second set of secondary UV lamps 26B to cure and solidify the secondary coating layer. The optical fiber 10 with the primary and secondary coatings then passes through a tertiary/ink coater 24C (third coater) to apply a UV curable acrylate liquid ink tertiary coating. The optical fiber 10 with the liquid ink tertiary coating then passes through a third set of UV lamps 26C to cure and solidify the tertiary/ink layer. The optical fiber 10 with the three cured coating layers 14, 16 and 18 is pulled through the pair of tractors 28 and may be wound onto on a spool.

One or more of the first, second and third coating layers may be applied sequentially in line between the fiber cooling and tractor draw/winding operations with the fiber draw process operating at a draw speed greater than 40 meters/second, and more particularly at a speed greater than or equal to 50 meters/second. One or more of the first, second and third coating layers may be applied in a coating process off-line and separate from the fiber draw process. Each of the primary coater 24A, secondary coater 24B and tertiary (ink) coater 24C includes an optical fiber coating die assembly for applying the corresponding coating layer onto the optical fiber 10. One or more or all of the coaters 24A-24C may employ an optical fiber coating die assembly 24 as shown in FIG. 3 and described herein, according to one embodiment. In another embodiment, one or both of the secondary coater 24B and tertiary/ink coater 24C may employ the optical fiber coating die assembly 24.

Referring to FIG. 3, the optical fiber coating die assembly 24 for coating one or more of the coating layers onto the optical fiber 10 is illustrated according to one embodiment. The coating die assembly 24 includes a housing 30 that generally defines an elongated guide chamber 40 having a generally cylindrical inner wall extending between an inlet 42 and an outlet 46. The housing 30 may be made of a metal, particularly a hardened steel such as tungsten carbide, for example. The housing 30 is connected to a die cap holder 32.

The guide chamber 40 has a length $L_{GC}$ of about 3.2 cm and a cylindrical cross section with a diameter typically in the range of 0.2-0.3 cm. The guide chamber 40 may include a first taper 44 that widens towards the inlet 42 and a second taper 47 that widens towards the outlet 46. The first taper 44 may have a tapered angle of 15 degrees extending a length of about 0.6 cm. The second taper 47 may have a tapered half-angle of 45 degrees and extending a length of about 0.1 cm.

The optical fiber coating die assembly 24 includes a guide die 34 located at the outlet 46 of the guide chamber 40. The guide die 34 may be pressed into a bore in a surface of a holder with a slight interference fit. The guide die 34 has a central guide die orifice 64 and a lead-in chamfer 62 extending towards the outlet 46 of the guide chamber 40. The guide die 34 receives the optical fiber 10 within orifice 64 and guides the optical fiber 10 through the orifice 64 and into a coating applicator 36 which contains the liquid coating.

The coating die assembly 24 has a sizing die 38 located at the outlet 48 of coating die assembly 24. The coating applicator 36 is disposed between the guide die 34 and the sizing die 38. The coating applicator 36 generally receives holds a reservoir of liquid coating 76 which may be in the form of a UV light curable acrylate coating composition that is used to coat the optical fiber 10 as the fiber 10 passes through the coating applicator 36 between the guide die 34 and sizing die 38. The coating applicator 36 may include a liquid flow insert that receives the liquid coating 76 from a supply source and distributes the coating onto the outer surface of the optical fiber 10. As the optical fiber 10 passes through the coating applicator 36, a controlled layer of the liquid coating is applied onto the outer surface of the optical fiber 10. The sizing die 38 has a central sizing die orifice 70 and a lead chamfer surface 72 to improve the flow characteristics of the liquid coating and to remove excess liquid coating material on the fiber 10 to form a uniform diameter coating on the optical fiber as the fiber 10 exits outlet 48 of the coating die assembly 24.

The coating die assembly 24 further includes a tube 50 operatively coupled to the inlet 42 of the guide chamber 40 and coaxially aligned with the guide chamber 40 to receive the optical fiber 10 that is fed into the guide chamber 40. The tube 50 serves as an extension tube that extends the chamber on the inlet side of the guide chamber 40. The tube 50 surrounds the optical fiber 10 and provides an extended barrier to air flow as the optical fiber 10 is drawn through the coating die assembly 24. The tube 50 has an internal wall defining a cylindrical tube chamber 52 extending between a tube outlet 56 and a tube inlet 54.

A purge gas 60 is introduced into the guide chamber 40, preferably near the outlet 46 end of the chamber 40. The optical fiber 10 is drawn in a first direction into and through tube 50 and guide chamber 40. The purge gas 60 flows at a controlled flow rate in a second direction from the outlet 46 toward the inlet 42 of the guide chamber 40, which direction is opposite the first direction of travel of the optical fiber 10. The purge gas 60 further flows within the cylindrical tube chamber 52 of tube 50 towards the tube inlet 54 and exits the tube inlet 54. The purge gas 60 may include carbon dioxide flowing at a flow rate of at least 1 SLPM, more preferably greater than 3 SLPM, and more preferably greater than 6 SLPM. The extended tube 50 is located at the inlet side of the guide chamber 40 to prevent air backflow in the guide chamber 40 and may enable the purge gas 60 to strip an air boundary layer from the optical fiber 10 as it passes through the tube 50 and enters the guide chamber 40 at a high draw speed typically above 40 meters/second, such as 50 meters/second.

The extension tube 50 may be a separate component that is connected to the housing 30 such that the tube chamber 52 is coaxially aligned with the guide chamber 40 using one or more mechanical connections, including, but not limited to fasteners, adhesives, welding, and other known connectors to provide an inline coaxial connection with the guide chamber 40 of housing 30. The extension tube 50 may be made of metal, particularly a hardened metal such as tungsten carbide, for example. The tube 50 could be a separate tube that is welded to the housing and is sealed therewith to prevent purge gas leakage and maintain alignment with the guide chamber 40, according to one embodiment. In another embodiment, the tube 50 may be integrally formed with the housing 30 and guide chamber 40 such as with an extruded or die cast assembly.

The tube 50 has a cylindrical cross section with an inside diameter $D_T$ in the range of 0.7 millimeters to 5.0 millimeters, according to one embodiment, and more preferably has an inside diameter $D_T$ in the range of 1.0 to 3.0 millimeters. That is, according to some embodiments the tube 50 has a bore with the internal diameter of 0.7 millimeters to 5.0 millimeters, and more preferably of 1.0 to 3.0 millimeters. The tube 50 has a length $L_T$ of at least 5.0 centimeters. More particularly, the tube 50 may have a length in the range of 5.0 centimeters to 25.0 centimeters, and more particularly has a length in the range of 5.0 to 12.0 centimeters. The tube 50 may further have a taper with an internal taper angle at the inlet end in the range of 3 to 20 degrees, and the taper (i.e., tapered region) may have a length of more than 1 centimeter. The taper internal angle may preferably be in the range of 3 to 10 degrees.

The tube 50 having length $L_T$ coaxially aligned with the guide chamber 40 having length $L_{GC}$ extends the overall length of the chamber surrounding the fiber as shown by extended chamber length $L_C$. As such, the housing 30 defines at least a portion of the extended guide chamber which is extended by the tube chamber 52 provided by tube 50.

At high fiber draw speeds, the tube 50 allows for an increased time for the purge gap flowing within the chamber to strip the air from the coated fiber boundary layer, lessens the movement of the optical fiber 10 within the guide chamber as it enters the guide chamber, and may allow the purge gas 60 to expand more uniformly with a taper which may further help lower the vibration of the coated fiber entering the coating die assembly 24 passing through the coating applicator 36. The coating die assembly 24 therefore minimizes and prevents the formation of voids within the coating layers.

The optical fiber discussed herein may be flexible, transparent optical fibers made of glass and/or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise any suitable material, for example silica based glasses. Other materials such as fluorozirconate, fluoroaluminate, and chalcogenide glasses, as well as crystalline materials, such as sapphire, may be used. The light may be guided down the core of the optical fibers by an optical cladding with a lower refractive index that traps light and/or directs light in or toward the core through reflection (e.g., total internal reflection). The cladding may be coated by a polymeric buffer and/or another coating(s) that protects it from moisture and/or physical damage. These coatings may be UV-cured urethane acrylate composite materials applied to the outside of the optical fiber during the drawing process. The coatings may protect the strands of glass fiber. The optical fibers may be bend insensitive, as discussed above, and/or may be single mode, multimode, and/or multicore fibers.

The described embodiments are preferred and/or illustrated, but are not limiting. Various modifications are considered within the purview and scope of the appended claims.

What is claimed is:

1. An optical fiber coating die assembly comprising:
   a housing defining a guide chamber having: an inlet for receiving optical fiber and an outlet;
   a guide die located at the outlet of the guide chamber;
   a sizing die;
   a coating applicator disposed between the guide die and the sizing die; and
   a tube operatively coupled to the inlet of the guide chamber and axially aligned with the guide chamber structured to receive the optical fiber fed into the guide chamber and provide a barrier to air flow, wherein the tube has a length of at least 5 centimeters wherein the tube extends above a top surface of the housing, wherein the housing receives a purge gas that flows into the guide chamber to the tube and exits at the tube inlet.

2. The coating die assembly of claim 1, wherein the guide chamber has a cylindrical cross section with a diameter of 0.2 cm to 0.3 cm.

3. The coating die assembly of claim 1, wherein the tube is integrally formed with the housing and the guide chamber.

4. The coating die assembly of claim 1, wherein the tube has a length in the range of 5-25 centimeters.

5. The coating die assembly of claim 4, wherein the tube has a length in the range of 5-12 centimeters.

6. The coating die assembly of claim 1, wherein the tube has an internal cylindrical bore with an internal diameter in the range of 0.7 millimeters to 5.0 millimeters.

7. The coating die assembly of claim 6, wherein the internal diameter is in the range of 1-3 millimeters.

8. The coating die assembly of claim 1, wherein the tube has an internal taper angle at an inlet end in the range of 3-20 degrees and the taper has a length of more than 1 centimeter.

9. The coating die assembly of claim 8, wherein the internal taper angle is in the range of 3-10 degrees.

10. An optical fiber coating die assembly comprising:
    a housing defining at least a portion of a guide chamber for receiving optical fiber at an inlet, wherein the guide chamber has a length greater than 10 centimeters;
    a guide die located at an exit of the guide chamber, wherein the guide chamber comprises a first cylindrical bore formed in the housing and a second cylindrical bore defined by an extension tube coaxially aligned with the first cylindrical bore and wherein the tube extends above a top surface of the housing, wherein the housing is structured to receive a purge gas that flows into the exit of the guide chamber and exits the inlet and wherein the extension tube is structured to receive the purge gas from the housing and exits toward an inlet of the extension tube;
    a sizing die; and
    a coating applicator disposed between the guide die and the sizing die.

11. The coating die assembly of claim 10, wherein the extension tube has a length in the range of 5-12 centimeters.

12. The coating die assembly of claim 10, wherein the extension tube has a length in the range of 5-25 centimeters.

13. The coating die assembly of claim 11, wherein the extension tube has an internal taper angle at an inlet end in the range of 3-20 degrees and the taper has a length of more than 1 centimeter.

14. The coating die assembly of claim 13, wherein the internal taper angle is in the range of 3-10 degrees.

15. The coating die assembly of claim 10, wherein the tube is integrally formed with the housing and the guide chamber.

16. The coating die assembly of claim 11, wherein the extension tube has a cylindrical bore with an internal diameter in the range of 0.7 millimeters to 5.0 millimeters.

* * * * *